Nov. 3, 1942.                D. HOSMER                2,300,896
                              SIGNAL
                 Filed Oct. 17, 1939        2 Sheets-Sheet 1

INVENTOR.
Daniel Hosmer
by Parker, Rockwell & Farmer.
ATTORNEYS.

Nov. 3, 1942.   D. HOSMER   2,300,896
SIGNAL
Filed Oct. 17, 1939   2 Sheets-Sheet 2

INVENTOR.
Daniel Hosmer
By Parker, Rockwood & Farmer
ATTORNEYS.

Patented Nov. 3, 1942

2,300,896

UNITED STATES PATENT OFFICE 2,300,896

SIGNAL

Daniel Hosmer, Buffalo, N. Y.

Application October 17, 1939, Serial No. 299,852

5 Claims. (Cl. 177—327)

This invention relates to signals, and particularly to those which are useful on motor vehicles, power boats, airplanes and the like, for indicating through a selective operation of signals the intentions of the operator of the vehicle, boat or airplane.

An object of the invention is to provide an improved signalling device of this type which will be relatively simple, compact and inexpensive, and which will more effectively indicate the intentions of the operator of the vehicle, boat or airplane, and thus lessen the probability of collisions with other vehicles, boats or airplanes.

Another object of the invention is to provide an improved signalling system of this type which will create a more effective warning to others of the intentions of the operator of the vehicle, boat or airplane than has heretofore been possible; which will utilize apparent repeated motions of the signal or signal lights in a manner to effectively attract the attention of other approaching operators, and therefore lessen the danger of collisions; and with which a considerable variety of different signals may be given.

Another object of the invention is to provide an improved and simple signalling system, which will effectively attract the prompt attention of other approaching operators and lessen the possibilities of collisions, which will more effectively and promptly attract the attention of approaching operators who may be more or less drowsy, and which may be used to give a variety of different signals, and which will give signals that are distinctive in character and not easily confused with stationary lights such as one might find along travel lanes.

Other objects and advantages will be apparent from the following description of several embodiments of the invention, and the novel features will be particularly pointed out hereinafter in connection with the appended claims.

Figure 1:
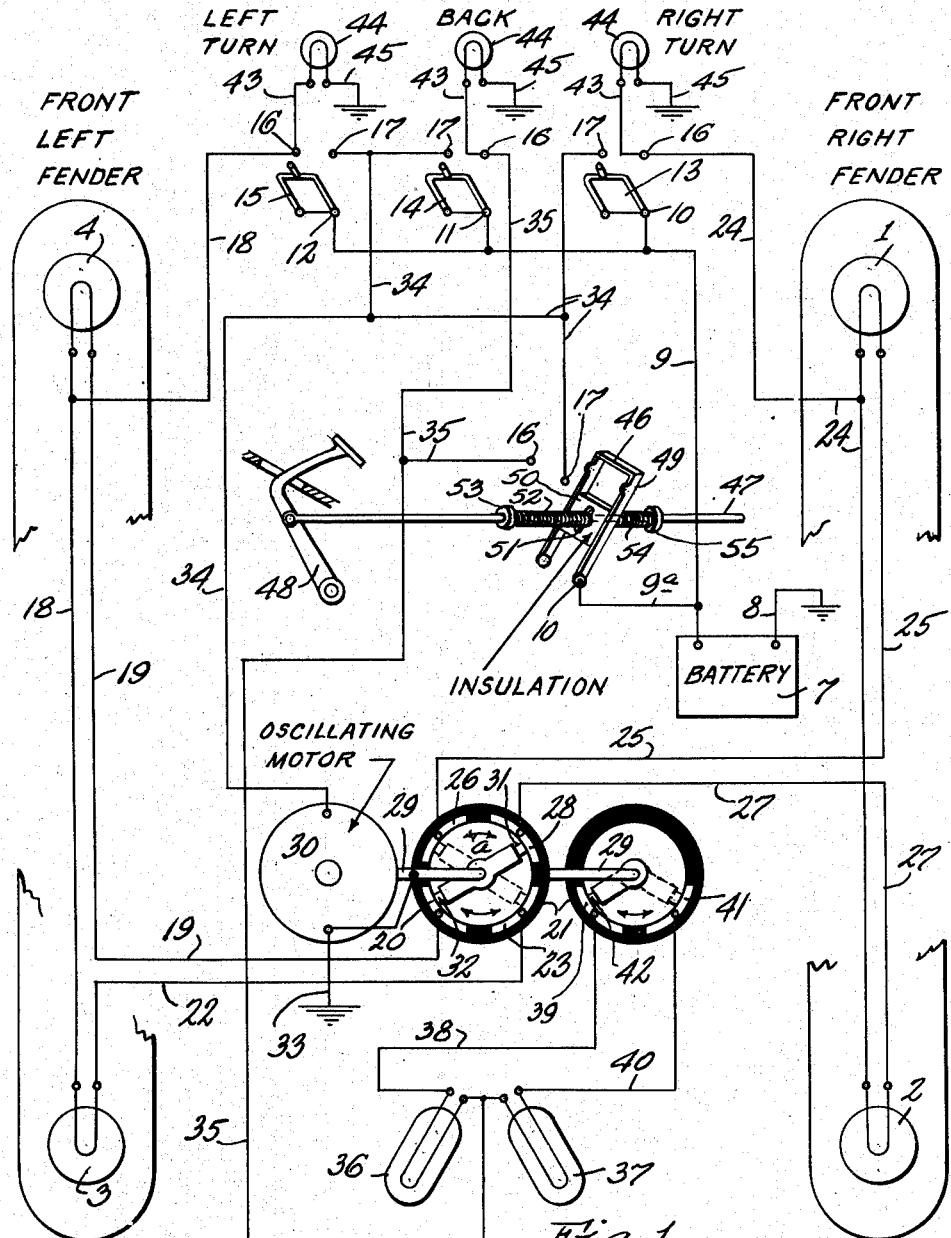
Fig. 1 is a schematic diagram of an application of the improved signalling system to a motor vehicle of the automobile type and illustrating one embodiment thereof.
Figure 5:
Fig. 5 is an elevation, partly in section, of one of the signal devices.

In the embodiment of the invention illustrated in Fig. 1 in which the system is illustrated as applied to an ordinary automobile, a plurality of electrically operated signalling devices 1, 2, 3 and 4 are arranged for mounting at suitable points on the vehicle, preferably adjacent or at the four corners thereof, and inasmuch as the fenders of a motor vehicle are convenient means for the mounting of such signalling devices, I have illustrated the signalling devices 1, 2, 3 and 4 as mounted upon the four fenders of the vehicle at approximately the four corners of the vehicle. It will be understood, however, that these signalling devices may be mounted at any other suitable parts of the vehicle, but preferably adjacent the corners thereof. The signalling devices 1, 2, 3 and 4 may be of any electrically operated type, but for simplicity they are of a lamp bulb type, in which the lamp 5 (Fig. 5) is enclosed within a housing having a transparent or translucent lens or wall zone 6 thereof which is readily visible and illuminated when the bulb 5 therein is illuminated.

The signal devices at the front of the vehicle have their light transmitting wall zones or lenses 6 of any selected color such as white, green or amber, and preferably amber color because that color is commonly used to indicate caution in highway signalling. The signalling devices 2 and 3 at the rear of the vehicle preferably have their lenses or light transmitting wall zones 6 of reddish color because the color red is commonly employed as an indication of danger upon the rear of moving bodies or vehicles. Current for the system is supplied from any suitable source, such as a storage or other battery 7, one terminal of which is for convenience grounded by a wire 8. The other terminal of the battery or source 7 is connected by a wire 9 to the live terminals 10, 11 and 12 of three switches 13, 14 and 15 respectively. These switches are of any suitable construction in each of which the live terminal or contact thereof is connected, when the switch is closed, to two spaced terminals 16 and 17, but which terminals 16 and 17 of each switch are disconnected from one another and from the live contact when the switch is open.

The terminal 16 of switch 15 is connected by a wire 18 to one terminal of each of the signalling devices 3 and 4 which, in the particular example, represent the signalling devices on the rear and front respectively of the left side of the vehicle, that is, on the rear and front left fenders if it happens to be an automobile. The other terminal of the signalling device 4 is connected by a wire 19 to a contact segment 20 of a distributor device 21, and the other terminal of the signalling device 3 is connected by a wire 22 to another contact segment 23 of the same distributor device 21. Similarly the terminal 16 of the switch 13 is connected by a wire 24 to one side of each of the signal devices 1 and 2 which are on the right hand side of the vehicle at the front and rear thereof, and the other terminal of the signal device 1 is connected by a wire 25 to a contact segment 26 of the distributor 21.

The other terminal of the signal device 2 is connected by a wire 27 to another contact segment 28 of the distributor 21. The distributor 21 is provided with an operating shaft 29 which is driven in any suitable manner from a motor 30, and this shaft 29 carries a pair of brushes 31 and 32. The brushes 31 and 32 are grounded through the shaft 29 to the motor frame 30 and through the latter by a wire 33 to the frame of the vehicle. The motor 30 is shown as of the oscillating type which can be purchased in the open market, such oscillating motors being useful in electrically operated windshield wipers and having other uses. The details of such oscillating motors are not a part of this invention and for that reason only general reference thereto is made.

When the motor 30 is operated it oscillates the shaft 29 of the distributor through an arc which is less than a full revolution and in the particular example is less than a half revolution. The segments 20, 23, 26 and 28 are arranged along arcs forming part of a circle whose center of curvature is the axis of the shaft 29, and when the motor 30 is operated to cause oscillation of the shaft 29, the brush 31 will oscillate in the directions of the arrow a so as to contact alternately with and wipe along the segments 26 and 28, one at a time, so as to connect the wires 25 and 27 alternately to ground through the motor. Similarly the brush 32 contacts alternately with and wipes along the contact segments 20 and 23 so as to alternately connect the wires 19 and 22 to ground through the motor.

The segments 28 and 20 which are diametrically opposite are connected to the right rear signalling device 2 and the front left signalling device 4 respectively, and since the brushes 31 and 32 are shown as diametrically opposite with respect to the shaft 29, they will be synchronized with respect to one another through their mounting on the shaft 29, and will connect to ground, at the same time, the signalling devices at diametrically opposite corners of the vehicle but will never connect simultaneously to ground the signalling devices on the same side of the vehicle. Similarly the brushes 31 and 32 will connect to ground, at the same time, the segments 23 and 26, which are connected to the signalling devices 3 and 1 respectively at diametrically opposite corners of the vehicle.

The terminal 17 of the switch 13 is connected by a wire 34 to the motor 30, so that when the switch 13 is closed it completes one circuit through contact 16 of that switch to the signalling devices on the right hand side of the vehicle, and another circuit through contact 17 of that switch to the motor 30, to start the same. Thus the circuit to the motor will be completed simultaneously with the completion of the circuit to the signalling devices on the right hand side of the vehicle, and as the motor 30 operates it will alternately and individually ground the circuits of the signalling devices on the right hand side of the vehicle. Similarly the connection 17 of the switch 15 is connected to the wire 34 leading to the motor, so that whenever the switch 15 is closed it not only completes a circuit to the signalling devices on the left hand side of the vehicle, but it also completes a circuit to the motor so as to cause an operation of the distributor 21 and an alternate blinking operation of the signalling devices 3 and 4.

The contact 16 of the switch 14 is connected by a wire 35 to a common terminal of two lamps 36 and 37 mounted at one end of the vehicle such as at the rear thereof. These lamps 36 and 37 are arranged in a row extending in a direction crosswise of the length of the vehicle, and in reasonably close proximity to one another. The other terminal of the lamp 36 is connected by a wire 38 to a segment 39 of the distributor 21, and similarly the other terminal of the lamp 37 is connected by a wire 40 to a contact segment 41 of the distributor 21.

The shaft 29 of the distributor may also have a brush 42 which wipes along and contacts with the segments 39 and 41, so as to ground alternately the branch circuits through the lamps 36 and 37. Thus the lamps 36 and 37 will be blinked alternately so as to create the sensation of a light moving between those two positions back and forth, with only one at a time being illuminated. This gives the visual impression of motion or oscillation of a light at the rear of the vehicle. The terminal 16 of each switch 13, 14 and 15 is also connected by a wire 43 to an individual tell-tale signal or pilot light 44, the other side of which is grounded by wire 45. Thus when any particular switch is closed, a tell-tale device or pilot lamp 44 which is associated with that switch will indicate the open or closed condition of that switch.

A wire 9a connects the wire 9 to the live contact or terminal 10 of another switch 46 which is operated in any suitable manner by a link 47 that is connected to a brake operating lever or member 48. This member 48 is preferably the foot pedal of the vehicle, so that the switch 46 will be operated into closed position automatically each time that the brakes are applied through operation of the usual brake foot pedal 48. The switch 46, when moved into closed position, completes a circuit from the live contact 10 to spaced terminals 16 and 17 which are similar to the terminals 16 and 17 of the switches 13, 14 and 15, above described. The terminal 17 of switch 46 is connected to the wire 34, and the terminal 16 in switch 46 is connected to the wire 35.

The switch 46 may be of any suitable construction enabling its operation into and out of closed position, and which when operated in either direction will permit continued movement of the operating member after the switch is closed or opened. As one example of a construction by which this may be accomplished, the switch 46 may have a U-shaped member 49 of conducting material hinged at the free ends of the arm of the U, one of which hinges is the live terminal 10. The arms of the U are connected by an insulating block 50 having a slot 51 in which the operating rod 47 loosely passes. A compressible spring 52 is disposed between the block 50 and a fixed collar 53 on the operating rod 47, so as to urge the contact member 49 towards open position when compressed.

A similar spring 54 is also disposed between the opposite face of the block 50 and another fixed collar 55 on the rod 47, so as to urge the switch member 49 in the opposite direction. Thus the switch member 49 is in effect floatingly mounted on the rod 47 but normally held by the springs 52 and 54 in an intermediate position on rod 47. When the operating rod 47 is operated endwise in either direction it will, through the spring 52 or 54, yieldingly urge the switch member 49 in the same direction and carry it into open or closed position, that is, into engagement with the terminals 16 and 17 when the brake is applied, and carry it out of contact with those terminals upon release and retraction of the brake pedal 48. The switch 46 is thus connected in parallel across the switch 14, and when closed it completes the same circuits as are completed by the switch 14 when it is closed.

In the operation of the system shown in Fig. 1, when the driver of the vehicle wishes to indicate his intention to make a left turn he closes the switch 15, whereupon current from the battery 7 passes through wire 9 to the switch 15, thence through three branch circuits. One branch circuit is from the switch 15 through its terminal 17 and wire 34 to the motor 30 and the ground, another branch is through the terminal 16 in switch 15, through wire 43, tell-tale signal 44 and wire 45 to ground, and the third branch is through the terminal 16 of switch 15, wire 18, then alternately through the signals 3 and 4 as determined by the position of the brush 32. When the motor 30 is started it oscillates the brush 32 to wipe alternately with the contact segments 20 and 23, thus completing the circuits through the signal devices 3 and 4 alternately. This will continue as long as the switch 15 remains closed. When the switch 15 is opened these circuits are all opened and the motor stops.

If the driver wishes to indicate that he is about to make a right turn, he closes the switch 13 and this completes three branch circuits from the battery 7, one of which is through wire 34 of the motor to start the motor and place the distributor brush 31 in oscillation, another is through the tell-tale signal 44 associated with that switch, and the third is through the signal devices 1 and 2 alternately as the brush 31 oscillates back and forth over the segments 26 and 28. If one desires to signal his intention to make a stop or to back up, he either presses the brake pedal 48 or closes the switch 14 respectively, in which event the switch 46 or 14 will be closed, and since these switches are in parallel to one another they will complete a circuit through the wire 34 of the motor to start the motor going and also complete a circuit through the wire 35 to the signal lights 36 and 37. The circuits through these lights 36 and 37 are completed alternately by the brush 42 which is oscillated by the motor 30.

The completion of the circuits through the lamps 36 and 37 alternately, one at a time, gives the impression of a light moving or oscillating between the positions represented by those lights. The lights 36 and 37 are preferably elongated and arranged with their longitudinal axes radial to a common center in reasonably close proximity thereto, as shown in Fig. 1, and when the lamps 36 and 37 arranged in this manner are flashed alternately at the proper frequency, they give the visual impression of a swinging lantern or light. Such a swinging lantern is more likely to promptly catch the eye of an approaching motorist, enable him to distinguish the signal from a tail light of a vehicle moving in the same direction, and clearly indicate that something unusual ahead requires caution or represents danger. Stationary lights on the rear of the vehicle do not at once indicate whether the vehicle is moving or stationary and are apt to be confused with stationary caution lights, and many motorists do not respond as quickly to stationary danger lights as they do to an oscillating light, especially if they are at all drowsy.

In the embodiment of the invention illustrated in Fig. 3 the system is generally the same as in Fig. 1, except that the lights 36 and 37 and the wire 35 below the connection to the terminal 16 of switch 46 are omitted and the distributor segments 39 and 41 and brush 42 are omitted with the wires 38 and 40. Instead, an electric light or filament lamp 56 is mounted directly on the oscillating shaft 29 in place of the distributor brush 42, with the filament of the lamp eccentric to the axis of the shaft 29. One terminal of the lamp 56 is grounded to the shaft 29, and the other terminal is connected by a wire 57 to the wire 34 which leads to the motor 30.

Thus, whenever the motor 30 operates and the shaft 29 of the distributor is oscillated, the lamp 56 will be actually and bodily swung or oscillated about the axis of the shaft 29, so as to create the visual impression of a swinging danger light on the rear of an automobile.

The lamp 56 is connected in shunt to the motor 30 so that it is illuminated every time that the motor 30 operates. The lamp 56 could, if desired, also be connected only to the switches 14 and 46, the same as the lamps 36 and 37 are connected to those switches, so that the lamp 56 would then only be illuminated when the switches 14 and 46 are closed.

Figure 3:
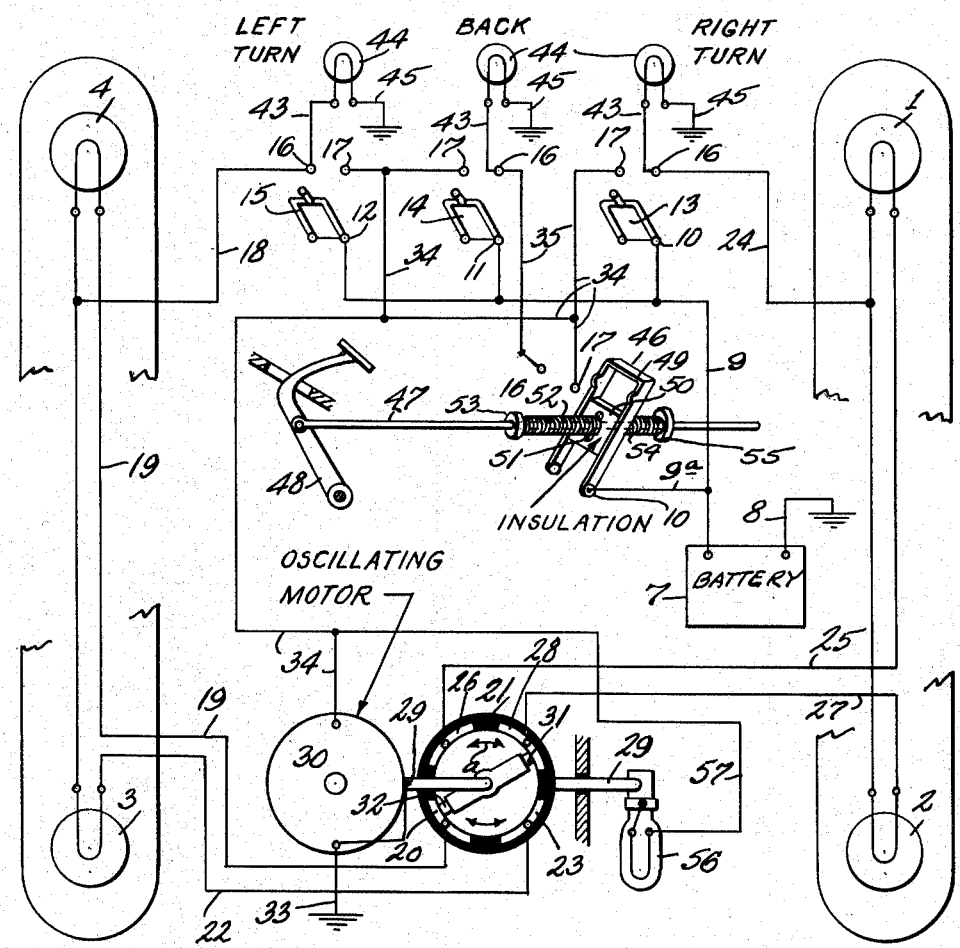
Fig. 3 is a schematic diagram similar to Fig. 1 but illustrating a slightly different type of signal upon the rear of the vehicle, and illustrating another embodiment of the invention.

The operation of the system of Fig. 3 is the same as for the system of Fig. 1, except that in the connection shown, the lamp 56 will be illuminated and swung each time that the motor operates, even for left and right turns when any of the signal devices 1, 2, 3 and 4 are operating.

Figure 4:
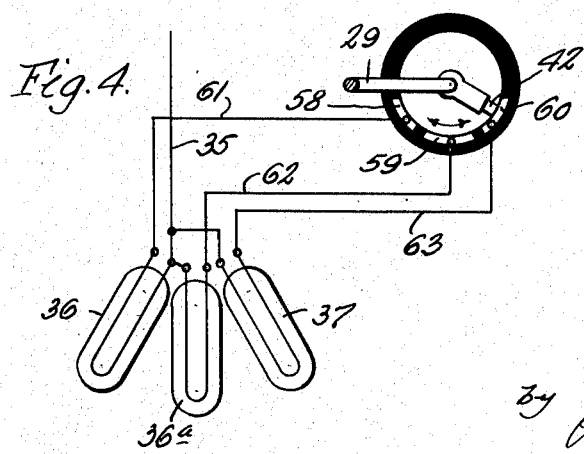
Fig. 4 is a schematic diagram of a portion of the system of Fig. 1 modified to produce more effectively the visual impression of an oscillating light.

In Fig. 4 a slight modification of the system of Fig. 1 is illustrated. To create a more perfect visualization of a swinging lantern, three or more lamps 36, 36a and 37 are arranged in radial form, the same as in Fig. 1, except that they may occupy a greater distance and thus represent greater limits of apparent movement. As the lights 36, 36a and 37 are individually lighted in succession, back and forth, progressively, the greater number of successively lighted lamps in the succession in each direction gives a more realistic impression of a swinging or oscillating light than merely alternately blinking lamps. In this form of the invention, the segments 39 and 41 of Fig. 1 are replaced by three shorter segments 58, 59 and 60. The segment 58 is connected by a wire 61 to one terminal of the lamp 36, the other terminal of that lamp being connected to the common wire 35. One filament terminal of each of the lamps 36a and 37 is also connected to the same common wire 35.

The other terminal of the lamp 36a is connected by a wire 62 to the intermediate segment 59 and the other terminal of the lamp 37 is connected by a wire 63 to the segment 60. Thus as the shaft 29 oscillates during operation of the motor 30, the brush 42 will engage with and wipe along all of the segments 58, 59 and 60, back and forth, and complete the circuits through the lamps 36, 36a and 37 one at a time, first in one direction along the row with the three lamps, and then in the opposite direction. While only three lamps have been shown for simplicity, it will be understood that the number of lamps may be increased and for each added lamp, another segment must be added for engagement by the brush 42 within the limits of its arc of oscillation, and also wires from those added segments to the filament terminals of the added lamps. To create this sensation of the swinging or oscillating light, it is important that the lamps should be lighted only one at a time, and progressing first in one direction along the row and then in the opposite direction.

In the system of Fig. 1, in which the signal devices 1 and 2 are controlled from the segments 26 and 28, and the signal devices 3 and 4 are controlled from the segments 20 and 23, and the lamps 36 and 37 are controlled by separate segments 39 and 41, it is possible to obtain a somewhat different individual duration of lighting for any of the segnals 1, 2, 3 and 4, so that the duration may not necessarily be the same for all, and by shifting the positions and lengths of the segments with respect to the arcs of oscillation of the brushes, various different relative timings and durations of operation of the signal devices may be obtained. The lamps 36 and 37 can also be given a slightly different timing than the signal devices 2 and 3 by shifting the positions of the segments 39 and 41 and changing their lengths. With the arrangement of Fig. 1 it is also possible to use a rotary motor and drive the shaft 29 continuously in the same direction but at a reduced speed through the use of a speed reduction mechanism, and thus further modify the timing arrangement and duration of operation of the various signal devices and the lamps 36 and 37.

Figure 2:
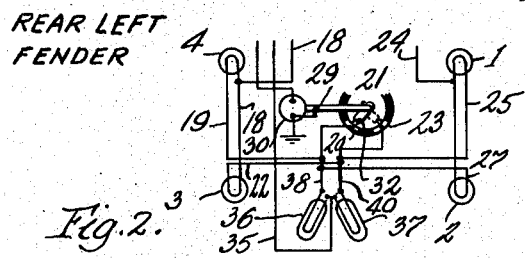
Fig. 2 is a diagram of a portion of Fig. 1 and showing a simplified embodiment thereof.

In the simplest form of the invention, where equal timing and duration of periods of operation will be satisfactory, the same general effect can be obtained by eliminating all of the tell-tale signals 44 and the segments 26, 28, 39 and 41 and connecting all of the signal devices 1, 2, 3 and 4 to the segments 20 and 23 and by connecting the wires 38 and 40 from the lamps 36 and 37 to the segments 20 and 23. This arrangement is shown in Fig. 2, and the parts in Fig. 2 which have corresponding parts in Fig. 1 are given the same reference characters as in Fig. 1. In Fig. 2 the single brush 32 merely engages alternately with the segments 20 and 23. The wires 19 and 22 are connected to the segments 20 and 23 respectively as in Fig. 1, and the wires 25 and 27 from the signal devices 1 and 2 respectively are connected to the segments 23 and 20 respectively. The wires 38 and 40, instead of being connected to separate segments as in Fig. 1, are connected to the segments 23 and 20 respectively. The operation is otherwise the same as explained in connection with Figs. 1 and 3.

It will be understood that various changes in the details and arrangements of parts, which have been herein described and illustrated in order to explain the nature of the invention, may be made by those skilled in the art within the principle and scope of the invention, as expressed in the appended claims.

I claim as my invention:

1. A signal for a motor vehicle for use with a source of current, comprising a plurality of electrically operable signal devices mountable adjacent the corners of the vehicle, an individual circuit for connection to said source for each of said signal devices, distributor means for opening and closing the circuits to said signal devices in a selected synchronized sequence, with the right front and left rear signal devices flashing in synchronism, the left front and right rear signal devices flashing in synchronism, and the right front and left front signal devices flashing alternately, switch means common to the individual circuits serving the signal devices at one side of the vehicle for rendering those signal devices effective or ineffective selectively, switch means connected in the individual circuits serving the signal devices at the other side of the vehicle for rendering those signal devices effective or ineffective selectively, and an electric motor operating said distributor means controlled in parallel by each of said switch means and having an operating circuit.

2. A signal for a motor vehicle for use with a source of current comprising a plurality of electrically operated signalling devices mountable on said vehicle at approximately the four corners thereof, individual circuits for each of said signalling devices, a switch for rendering effective the circuits to the signalling devices at one side of the vehicle, another switch operable to complete the individual circuits for the lights at the opposite side of said vehicle, distributor means included in the individual circuits for rendering the individual circuits of the signalling devices at each side of the vehicle alternately effective, with the right front and left rear signal devices flashing in synchronism, the left front and right rear signal devices flashing in synchronism, and the right front and left front signal devices flashing alternately, common power driven means for operating said distributor means, and means controlled in parallel by each of said switches for rendering said common means effective when the signalling devices mountable on either side of said vehicle are rendered effective.

3. A signal for a motor vehicle comprising a plurality of electrically operated signal devices mountable at approximately the corners of the vehicle, a plurality of switches, each having a live contact and a pair of terminals with both of which terminals connection is made to said live contact when that switch is closed, and both of which terminals are disconnected from one another when said switch is opened, a source of current connected at one side with the live contacts of each switch, a wire connecting one of said terminals of each switch to a terminal of both of the signal devices at the related side of the vehicle, distributor means for selectively connecting the other terminals of the signal devices at said related side to the other and common side of said source alternately and repeatedly, with the right front and left rear signal devices flashing in synchronism, the left front and right rear signal devices flashing in synchronism, and the right front and left front signal devices flashing alternately, also and motor driven means for operating said distributor means, connected at one terminal to said other side of the source and at its other terminal to the other terminal of each of said switches, whereby the closing of either switch will complete a circuit to said motor and to the signal devices controlled by that switch, and the other signal devices will remain ineffective.

4. A signal device for a motor vehicle comprising a plurality of electrically operated signal devices mountable at approximately the corners of the vehicle, a plurality of switches, each having a live contact and a pair of terminals with both of which terminals connection is made to said live contact when that switch is closed, and both of which terminals are disconnected from one another when said switch is opened, a source of current connected at one side with the live contacts of each switch, a wire connecting one of said terminals of each switch to a terminal of both of the signal devices at the related side of the vehicle, distributor means for selectively connecting the other terminals of the signal devices at said related side to the other and common side of said source alternately and repeatedly, with the right front and left rear signal devices flashing in synchronism, the left front and right rear signal devices flashing in synchronism, and the right front and left front signal devices flashing alternatively, motor driven means for operating said distributor means, connected at one terminal to said other side of the source and at its other terminal to the other terminal of each of said switches, whereby the closing of either switch will complete a circuit to said motor and to the signal devices controlled by that switch, and the other signal devices will remain ineffective, and an individual tell-tale signal for each of said switches connected at one side to the common side of said source and at its other side to the terminal of that switch which leads to the signalling devices controlled by that switch, whereby said tell-tale device will be operated only when that particular switch is closed.

5. A signal for a motor vehicle for use with a source of current comprising a plurality of electrically operable devices each mounted at approximately one of the corners of the vehicle, means including flasher switch means connected to the signal devices for one side of the vehicle for operating the devices on this one side alternately and repeatedly, means including flasher switch means connected to the signal devices for the opposite side of the vehicle for operating the devices on this opposite side alternately and repeatedly, the flasher switch means for each of the two sides being so related to each other that the right front and left rear signal devices flash in synchronism, the left front and right rear signal devices flash in synchronism, and the right front and left front signal devices flash alternately, and means including switch means for rendering the signal devices on one side of the vehicle effective and ineffective either independently of, or together with, the signal devices on the other side of the vehicle.

DANIEL HOSMER.